UNITED STATES PATENT OFFICE.

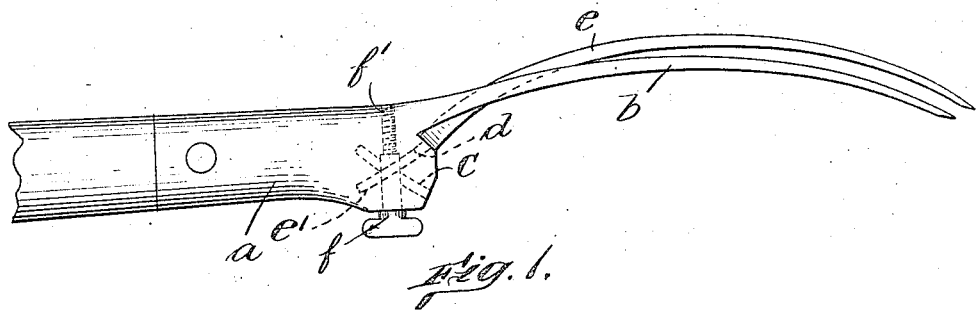
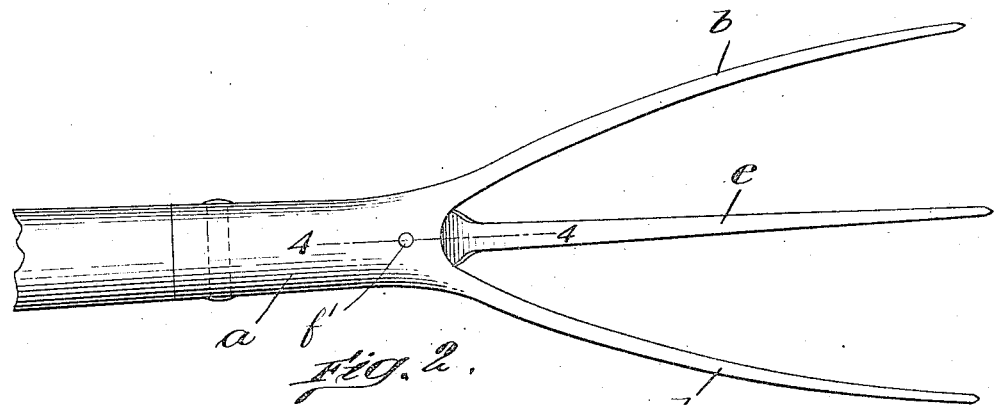
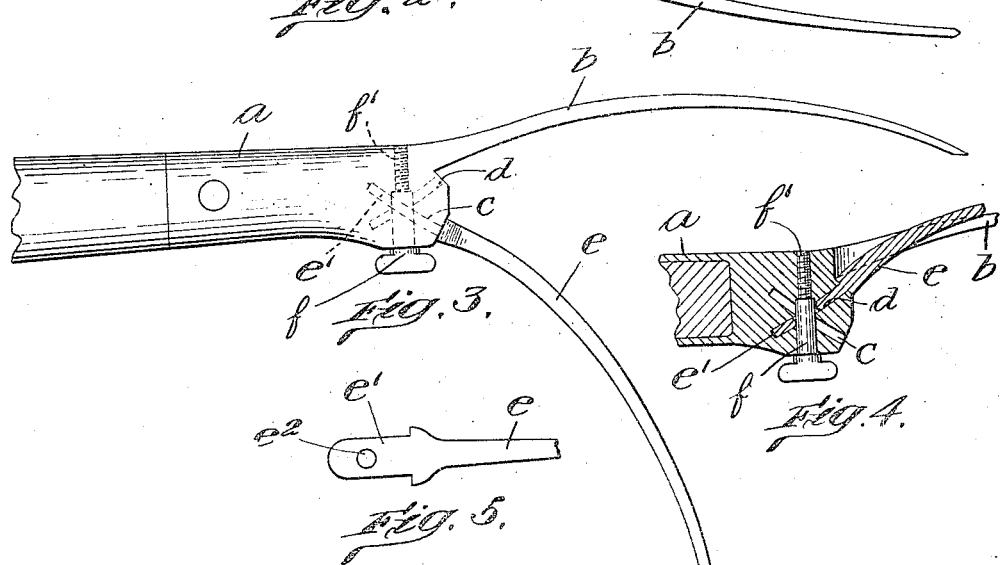

SARKIS MAKBOULIAN, OF HAVERHILL, MASSACHUSETTS.

HAY-FORK.

1,151,209.  Specification of Letters Patent.  Patented Aug. 24, 1915.

Application filed May 20, 1915. Serial No. 29,408.

*To all whom it may concern:*

Be it known that I, SARKIS MAKBOULIAN, a subject of the Sultan of Turkey, residing at Haverhill, in the county of Essex and State of Massachusetts, have invented an Improvement in Hay-Forks, of which the following is a specification.

This invention relates to certain improvements in hay forks, and has for its object to provide a form of hay fork which is adapted to be adjusted so that it may be used to the best advantage under different conditions or for different purposes. I accomplish this object by the means shown in the accompanying drawing, in which:—

Figure 1 is an edge view, and Fig. 2 is a plan view of a hay fork embodying my invention. Fig. 3 is a view similar to Fig. 1 showing the parts in a different position. Fig. 4 is a detail sectional view on the line 4—4, Fig. 2. Fig. 5 is a detail view of the shank of one of the tines.

As shown in the drawing, the usual shank $a$, which is adapted to be mounted on the ordinary wooden handle, is provided with a pair of diverging tines $b$, which extend therefrom at each side in a manner similar to that of an ordinary two-tine fork.

According to my invention, I provide in the shank $a$, a pair of sockets $c$ and $d$ which are located midway between the base ends of the tines $b$, and extend at an angle to each other, crossing midway of their lengths, at a distance from the end of the shank. I further provide a tine $e$ having a shank portion $e'$, which is adapted to fit in either of the sockets $c$ or $d$, said shank $e'$ having an opening $e^2$ therein, at the middle of its length, through which a fastening-screw $f$ is passed, said screw having a threaded end-portion $f'$ which is adapted to be screwed into the shank.

In use the tine $e$, will ordinarily be inserted in one or the other of the sockets $c$ or $d$. When in the socket $d$, it will be held in a position approximately in the plane of the other two tines $b$, as shown in Figs. 1, 2 and 4, and when in the socket $c$ it will be held in an oblique position relative thereto, as shown in Fig. 3.

The fastening-screw $f$ is adapted to be inserted through the aperture $e^2$, when the tine $e$ is in either socket, said aperture being so located that it will be held at the intersection of the sockets $c$ and $d$.

As the shank of the tine is made flat and tightly fitted in its socket, it will be held securely therein, when the screw $f$ is in position so that its removal is prevented.

When the tine $e$ is held in the socket $d$, the fork will be similar to the ordinary three-tine fork, and will be adapted for use for certain purposes, and when in the other socket $c$, it will be held in a position which is advantageous for other purposes, and particularly for pitching hay, and if only a two-tine fork is desired for use, the tine $e$ may be entirely removed.

I claim:—

1. A fork comprising a shank having a pair of tines extending therefrom and having a pair of sockets therein arranged therebetween in a plane approximately perpendicular to the plane of said tines and at an angle to each other, and a tine adapted to be held in either socket, and having means for removably securing it therein.

2. A fork comprising a shank having a pair of tines extending therefrom and having a pair of sockets therein arranged midway between said tines in angular relation and extending in a plane at approximately right angles to the plane of said tines, a tine constructed to be removably mounted in either of said sockets, so as to be held at correspondingly different angles, and means to lock said tine in either position.

3. A fork comprising a shank having a pair of tines extending therefrom, and having a pair of sockets therein opening midway between said tines and extending at different angles in a plane approximately at right angles to the plane of said tines, a tine constructed to be removably mounted in either sockets so as to be held at correspondingly different angles, the socket-entering-portion of the tine having an opening and a fastening pin arranged to pass through said opening in either position of the tine.

In testimony whereof I have signed my name to this specification.

SARKIS MAKBOULIAN.

Witness:
L. H. HARRIMAN.

Copies of this patent may be obtained for five cents each, by addressing the "Commissioner of Patents, Washington, D. C."